United States Patent [19]

Paleologos

[11] 4,363,213
[45] Dec. 14, 1982

[54] COMBINED BODY AND POWER GENERATING SYSTEM

[76] Inventor: George E. Paleologos, 9211 Georgia Ave., Silver Spring, Md. 20910

[21] Appl. No.: 242,439

[22] Filed: Mar. 11, 1981

[51] Int. Cl.³ .............................................. F03B 13/12
[52] U.S. Cl. ..................................... 60/505; 417/333; 290/53
[58] Field of Search ...................... 290/42, 53; 60/495, 60/497, 499, 500, 501, 505, 506; 417/330-333, 337

[56] References Cited

U.S. PATENT DOCUMENTS

| | | |
|---|---|---|
| 628,457 | 7/1899 | Gehre .................................... 290/42 |
| 717,113 | 12/1902 | Nelson ................................. 417/333 |
| 735,510 | 8/1903 | Hergenhan et al. .................. 60/501 |
| 816,934 | 3/1906 | Newell .................................. 60/500 |
| 1,156,355 | 10/1915 | Fisher .................................. 417/331 |
| 1,220,618 | 3/1917 | Fisher .................................. 417/331 |
| 1,502,511 | 7/1924 | Marvin ................................. 60/501 |
| 1,852,145 | 4/1932 | Brown ............................. 246/636 C |
| 2,477,691 | 8/1949 | Griffin ................................. 417/332 |
| 3,274,941 | 9/1966 | Parr ..................................... 417/331 |
| 3,515,889 | 6/1970 | Kammerer ............................ 290/53 |
| 3,569,725 | 3/1971 | Rosenberg ............................ 290/53 |
| 3,696,251 | 10/1972 | Last et al. ............................ 290/53 |
| 3,912,938 | 10/1975 | Filipenco ............................. 290/53 |
| 3,965,365 | 6/1976 | Parr ..................................... 290/53 |
| 4,081,962 | 4/1978 | Liu et al. ............................ 417/337 |
| 4,105,368 | 8/1978 | Waters ................................. 417/53 |
| 4,145,885 | 3/1979 | Solell .................................. 60/504 |
| 4,203,294 | 5/1980 | Budal et al. .......................... 60/497 |
| 4,210,821 | 6/1980 | Cockerell ............................. 290/53 |

Primary Examiner—J. V. Truhe
Assistant Examiner—Shelley Wade
Attorney, Agent, or Firm—Oblon, Fisher, Spivak, McClelland & Maier

[57] ABSTRACT

A system is disclosed for converting a standard buoy design into an electrical power producing apparatus. The vertical arms slide in sleeves attached to the buoy body and terminate in feet in the form of flat discs. As the buoy bobs and pivots in the water, the resistance of the feet to motion cause the arms to reciprocate, operating pneumatic piston pumps within the buoy. These piston pumps power pneumatic turbines which activate generators for producing electrical power. The moving parts of the linkages connecting the arms to the pumps are protected by a plastic casing which keeps out sea water. The casing includes facets which act as sails. Annular wipers are provided between the arms and sleeves within which the arms reciprocate, so as to prevent sea water from seeping therebetween.

6 Claims, 5 Drawing Figures

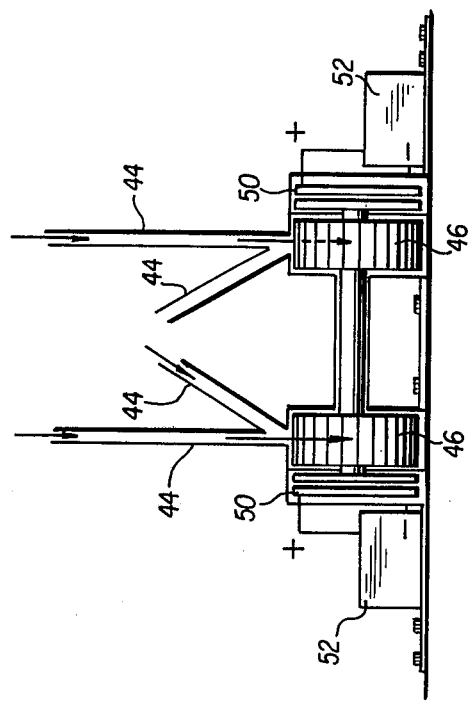
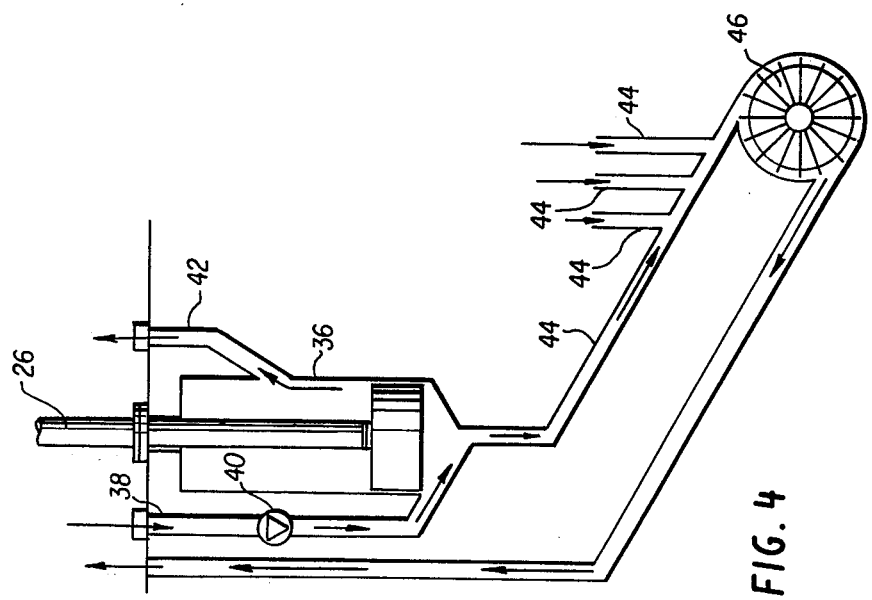
FIG. 5
FIG. 4

4,363,213

COMBINED BODY AND POWER GENERATING SYSTEM

BACKGROUND OF THE INVENTION

1. Field of the Invention

The present invention relates to a buoy including a power generating system, and more particularly to an apparatus attachable to a conventional buoy for converting the buoy into a power generating system.

2. Description of the Prior Art

It has recently become imperative to develop new sources of useful power. The problem of providing useful power is particularly acute in isolated locations where conventional sources of power in the form of electrical energy are not available. For example, work stations permanently, or temporarily, located at sea must be supplied with electrical power for operating equipment on the work stations.

One possible solution to this problem is to utilize the energy available in wave motion to produce usable electric power and, indeed, numerous attempts have been made in the past to devise structures for converting wave motion into usable power.

For example, large stationary structures, such as the random wave hydraulic engine disclosed in U.S. Pat. No. 4,125,346 have been proposed. In this structure, a large barge-like hull is moored via sleeves 320 and buoyant members 218 operate a pump in response to wave motion. However, a structure such as that of U.S. Pat. No. 4,125,346 is not truly portable and cannot be easily moved to the location of a work station, such as an oil rig, located at sea. Further, because of its static orientation, the hydraulic engine of U.S. Pat. No. 4,125,346 is unable to efficiently utilize all components of wave energy. That is, the buoyant members are only responsive to vertical components of the wave motion and cannot transform horizontal components of the wave motion into useful energy. A further shortcoming of structures of this type is that they must be constructed specifically for use as wave action energy producing structures and are therefore relatively expensive.

A second type of prior art action producing structure is exemplified by U.S. Pat. No. 3,922,739. This patent discloses a structure which is not permanently moored and can be used as a buoy in addition to use as an energy producing apparatus. However, this type of prior art apparatus also suffers from several shortcomings. First, the hydraulic pistion 6 of U.S. Pat. No. 3,922,739 is responsive only to vertical movements of the structure and, accordingly, it also is unable to efficiently use all components of the wave motion. Further, the buoy structure of this patent is not a conventional buoy which can be altered to perform a power producing function, but rather must be specifically constructed for a hydraulic piston. Accordingly, this structure is also relatively expensive.

SUMMARY OF THE INVENTION

It is an object of the present invention to provide a structure for converting fluid motion into useful power.

It is a further object of the present invention to provide a structure for converting both wind and wave motion into useful power.

It is another object of the present invention to provide a structure for converting all components of wave motion into useful power.

It is another object of the present invention to provide a structure which has multiple functions.

It is another object of the present invention to provide a power producing structure which is portable and can be easily transported to a location in which electrical power is required.

It is another object of the present invention to provide a structure for producing electrical power which can be constructed by modifying already existing buoy designs.

It is another object of the present invention to provide an electrical power producing buoy in which the moving parts are protected from contact with sea water.

According to the aforementioned objects, the present invention is in the form of a mechanism which can be incorporated into an already existing buoy design for permitting the buoy to convert all components of wind and wave motion into useful power. The buoy remains useful for other purposes, such as marking channels, and can be easily transported to a work site at sea.

According to the present invention, the sides of conventional design buoy may be provided with a plurality of circumferentially spaced brackets formed of a non-corrosive material such as a rigid plastic or stainless steel. The brackets are provided, at the ends thereof, with hollow vertically oriented cylindrical sleeves in which arms can reciprocate, the arms and sleeves all being made of a material which is not corrosive in sea water. The bottom ends of the arms are provided with large, non-buoyant, feet in the form of flat discs formed of a non-corrosive material such as rigid plastic. The arms are connected to pistons within the buoy via a linkage system so that reciprocating movement of the arms result in reciprocating movements of the pistons. The linkage system is located above the buoy body and within a plastic casing which is sealed to the buoy body and also to the top of the sleeves. Therefore, the linkage system is protected against the corrosive effect of sea water by the plastic casing. Further, annular elastomeric wipers are provided within the sleeves so that sea water is prevented from seeping between the interior of the sleeves and the arms into the casing where it could corrode the linkages. The pistons operate pneumatic pumps of a conventional type, which in turn operate electrical generators of a conventional type within the buoy. Batteries may be provided as ballast within the buoy body.

According to the present invention, a conventional buoy design having a hollow floating body, can be converted by installing piston operated hydraulic pumps and a generator within the body. The brackets may simply be connected to the circumference of the buoy body and the linkages to the pistons. Further, one may simply bolt a plastic casing or covering to the top of the buoy body for sealing against the introduction of sea water. Accordingly, a conventional buoy may be easily converted according to the present invention.

According to the invention, the buoy body floats partially submerged at the surface of a body of water. Wave motion on the body of water causes the buoy to rise and fall with the wave, and also to pivot about its center of gravity, with a predetermined natural frequency. Both the up and down bobbing motion, and the pivoting of the buoy about its center of gravity, cause the feet at the ends of the arms to tend to move with the buoy. However, due to the large diameter of the feet, and the viscosity of the water, the feet tend to resist movement in phase with the buoy body. Accordingly, any type of wave motion causes some movement of the buoy body, and any movement of the buoy body results in some resistance to motion in either an up or down direction by all of the feet. The aforementioned resistance causes the arms to move up and down within the sleeves and to reciprocate the pistons via the aforementioned linkages. Thus, the present invention is able to utilize all components of wave motion.

Another feature of the present invention is that the covering or casing can be formed with concave peripheral facets which act as sails. Thus, wind forces can effectively act upon the buoy at a point substantially above the center of gravity thereof. Such wind forces create a moment about the center of gravity of the buoy, which increases the pivoting of the buoy about its center of gravity, and provides additional energy for conversion into useful power.

BRIEF DESCRIPTION OF THE DRAWINGS

Various other objects, features and attendant advantages of the present invention will be more fully appreciated as the same becomes better understood from the following detailed description when considered in connection with the accompanying drawings in which like references characters designate like or corresponding parts throughout the several views, and wherein:

FIG. 4 is a schematic illustration of a preferred penumatic pump arrangement; and FIG. 5 is a schematic representation of a preferred turbine-generator arrangement.

DETAILED DESCRIPTION OF THE PREFERRED EMBODIMENTS

The preferred embodiment will now be described with reference to the accompanying drawings, in which similar elements are identified by similar numbers throughout the various views.

Figure 1:
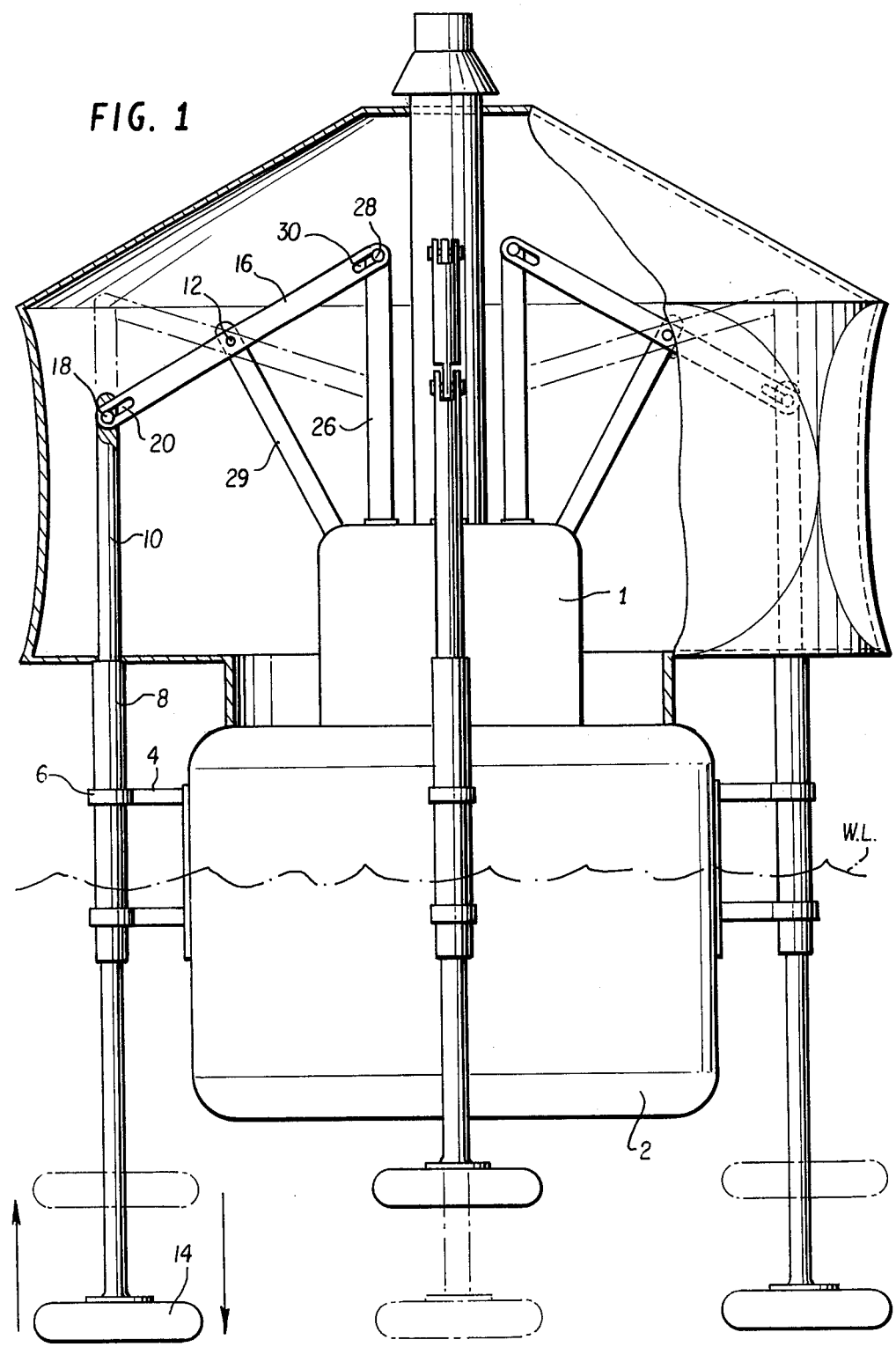
FIG. 1 is a side elevation showing the buoy of the present invention floating during use, with the plastic casing or covering for the linkage shown cut away.
Figure 2:
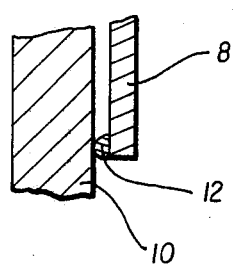
FIG. 2 is a detail showing the wiper located between the sleeves and the arms of the buoy.

FIG. 1 shows a conventional buoy consisting of a hollow body having an upper portion 1 and a lower portion 2, with the lower portion 2 partially submerged in water during use. A plurality of brackets 4 are attached, as by bolts, to the periphery of the lower portion 2, and are equally circumferentially spaced. Although four such brackets are shown in FIG. 1, any desired number could be provided. The brackets 4, which are preferably formed of a rigid plastic material, terminate in clamp portions 6 which rigidly support sleeves 8, also composed of a rigid plastic material and extending in the vertical direction. The typical rigid plastics usable for the brackets and throughout the apparatus, include P.V.C. and ABS resins. Where sliding or rotating contact between parts exists, the plastic parts may be coated with polytetrafluorethylene.

Each of the sleeves 8 are hollow and are of such a size that arms 10 can freely slide within these sleeves. An annular elastomeric wiper is secured to the interior of each of the sleeves, at the bottom thereof, to prevent sea water from seeping between the sleeve and the arms 10.

Each of the arms 10 has fixed thereof, at the bottom thereof, at least one foot 14 in the form of a large flat disc. Although only one foot 14 is shown for each arm in FIG. 1, each arm could include a vertical array of feet spaced along its length. The feet 14 are formed of thin large diameter discs of rigid light weight plastic material which resist movement through the water in the direction of the axes thereof. At the upper end thereof, the arms are connected to links 16 via pins 18 and slots 20. The links 16 pivot at 22 about the ends of second links 24 which are rigidly fixed to the upper section 1 of the buoy, as by bolts. Each of the first links 16 is also pivoted at the other end thereof to pistons 26, via pins 28 and slots 30. Although the above linkage arrangement has been disclosed as a preferred embodiment of the present invention, the present invention is not limited to the specific linkages described and other linkage arrangements providing similar motion transfer can also be used.

Figure 3:
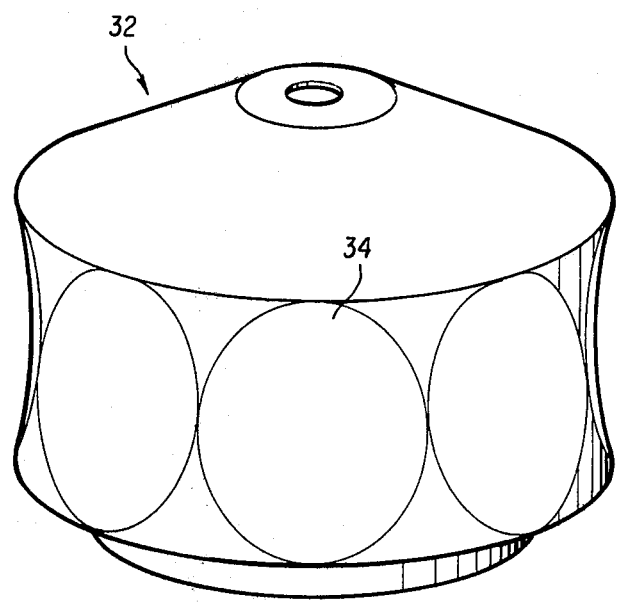
FIG. 3 shows the covering or casing, including the peripheral concave facets thereon.

A casing 32 may be seen in FIG. 3. The casing 32 is formed of a rigid light weight plastic material and is attached, as by bolts, to the top of the lower portion of the buoy, so that it encloses the aforementioned linkage system. The casing 32 is also fixed to the top of the sleeves 8 so that sea water cannot enter the interior of the casing adjacent the tops of the sleeves. The casing 32 is formed with a peripheral area having a circumferential array of concave facets 34. These concave facets act as sails to catch breezes and pivot the buoy about its center of gravity.

FIG. 4 is a schematic illustration of a preferred embodiment of the pneumatic pump operated by the arms 10. Each piston 26 reciprocates within a cylinder 36 within the body of the buoy. The cylinders include air inlets 38, including check valves 40, as well as air outlets 42. The air pumped by the pistons 26 flows through lines 44 to one or more pneumatic turbine fans 46, shown in FIGS. 4 and 5. FIG. 5 shows an embodiment wherein lines 44 are connected to a pair of turbine fans 46 rotatable about shaft 48, shaft 48 also being connected to electrical generators 50 which supply power to batteries 52. The present invention is not limited to the particular arrangement of turbines and generators shown in FIG. 5, but could use other well known turbine generator arrangements.

In the operation of the buoy according to the present invention, one or more buoys could be placed around a work site, such as an oil rig, for the purpose of marking sea routes around the oil rig. The buoys would float as a result of the buoyancy provided by the hollow buoy body itself. As the buoy floats in the sea water, the wave motion of the water causes the buoy to bob up and down, and to pivot about its center of gravity. Each of these types of movement cause the arms to move together with the buoy body, as well as the feet 14 attached to the arms 10. However, because of the disc shape of the feet 14, they tend to resist up and down movement. Further, because the arms are horizontally spaced from the center of gravity of the buoy, pivoting motion of the buoy about its center of gravity results in such up and down motion at the feet 14. As a result, the resistance of the feet 14 to movement in response to movement of the buoy causes the arms 10 move up and down within the sleeves 8. Further, the up and down reciprocation of the arms 10 results in reciprocation of the pistons 26, via the links 16. Such reciprocation of the pistons 26 pumps air through lines 44 to the turbines 46, which in turn operate the electrical generators 50 for supplying power to the batteries 52. The batteries 52 may be connected to appropriate lines for transmitting power from the buoy to the work station.

Sea water is highly corrosive and can cause encrustation of salt in the joints of the moving parts such as the link 16 and the piston 26. However, because of the casing 32, the moving parts are protected from encrustation by salt deposits left by sea water. Further, the elastomeric wipers 12 prevent sea water from seeping, or being pumped, between the arms 10 and the sleeves 8 into the area within the casing 32.

Casing 32 performs the additional function of acting as a sail for creating further pivoting of the buoy about its center of gravity. Specifically, the facets 34 act to catch sea breezes, resulting in horizontal forces acting upon the casing 32. These horizontal forces create moments about the center of gravity of the buoy, thereby increasing the number and amplitude of the pivoting motions.

The present invention is therefore able to utilize all components of fluid energy available to the buoy, and results in a power producing system which can be adapted to a conventional buoy design and which provides efficient production of useful power.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for producing power, comprising:
   a hollow buoy;
   electric generator means in said buoy;
   pneumatic turbine means in said buoy and operatively connected to said generator;
   at least two pneumatic pump means in said buoy and operatively connected to said turbine means;
   at least two vertical arms;
   means connected to said buoy and adapted for constraining each of said arms and for permitting reciprocation of said arms in the vertical direction;
   linkage means connecting one end of each of said arms to one of said pneumatic pump means;
   means for sealing said linkage means in a water tight manner; and
   foot means on the other end of each of said arms, said foot means adapted to resist movement in said vertical direction wherein said arms, said means for constraining said arms, said means for sealing and said foot means are formed of lightweight non-corrosive plastic material.

2. An apparatus for converting a hollow buoy into a power generating system comprising:
   electric generator means in said buoy;
   pneumatic turbine means in said buoy and operatively connected to said generator;
   at least two pneumatic pump means in said buoy and operatively connected to said turbine means;
   at least two vertical arms;
   means connected to said buoy and adapted for constraining each of said arms and for permitting reciprocation of said arms in the vertical direction;
   linkage means connecting one end of each of said arms to one of said pneumatic pump means;
   means for sealing said linkage means in a water tight manner; and
   foot means on the other end of each of said arms, said foot means adapted to resist movement in said vertical direction wherein said arms, said means for constraining said arms, said means for sealing and said foot means are formed of lightweight non-corrosive plastic material.

3. The apparatus of claims 1 or 2 wherein each said foot means comprise at least one disc oriented in a horizontal plane.

4. An apparatus for producing power, comprising:
   a hollow buoy;
   electric generator means in said buoy;
   pneumatic turbine means in said buoy and operatively connected to said generator;
   at least two pneumatic pump means in said buoy and operatively connected to said turbine means;
   at least two vertical arms;
   means connected to said buoy and adapted for constraining each of said arms and for permitting reciprocation of said arms in the vertical direction;
   linkage means connecting one end of each of said arms to one of said pneumatic pump means;
   means for sealing said linkage means in a water tight manner; and
   foot means on the other end of each of said arms, said foot means adapted to resist movement in said vertical direction, wherein said means for constraining each comprise a hollow vertical cylinder horizontally spaced from said buoy and bracket means fixing said cylinder to said buoy, and wherein each said arm reciprocates within the hollow of each said cylinder, wherein said means for sealing further comprises at least one annular elastomeric wiper secured to each said cylinder at the bottom of the hollow thereof, each said wiper extending between one of said cylinders and the arm therein, wherein said housing has a circumferential periphery and includes an array of concave facets on said periphery.

5. An apparatus for converting a hollow buoy into a power generating system comprising:
   electric means in said buoy;
   pneumatic turbine means in said buoy and operatively connected to said generator;
   at least two pneumatic pump means in said buoy and operatively connected to said turbine means;
   at least two vertical arms;
   means connected to said buoy and adapted for constraining each of said arms and for permitting reciprocation of said arms in the vertical direction;
   linkage means connecting one end of each of said arms to one of said pneumatic pump means;
   means for sealing said linkage means in a water tight manner; and
   foot means on the other end of each of said arms, said foot means adapted to resist movement in said vertical direction wherein said means for constraining each comprise a hollow vertical cylinder horizontally spaced from said buoy and bracket means fixing said cylinder to said buoy, and wherein each said arm reciprocates within the hollow of each said cylinder, wherein said means for sealing further comprises at least one annular elastomeric wiper secured to each said cylinder at the bottom of the hollow thereof, each said wiper extending between one of said cylinders and the arm therein, wherein said housing has a circumferential periphery and includes an array of concave facets on said periphery.

6. The apparatus of claim 4 or claim 5 wherein said means for sealing comprises a casing enclosing said linkage and secured to said buoy and to the tops of said cylinders.

* * * * *